(12) United States Patent
Fisher

(10) Patent No.: US 6,214,219 B1
(45) Date of Patent: Apr. 10, 2001

(54) KNOCK-DOWN SEPARATION OF EMULSIONS

(75) Inventor: Cal Fisher, Red Deer (CA)

(73) Assignee: Calvcs, LLC, Verdi, NV (US)

( * ) Notice: Subject to any disclaimer, the term of this patent is extended or adjusted under 35 U.S.C. 154(b) by 0 days.

(21) Appl. No.: 09/251,768

(22) Filed: Feb. 17, 1999

(51) Int. Cl.$^7$ ................................................. B01D 17/09
(52) U.S. Cl. ........................ 210/180; 96/182; 210/143; 210/257.1; 210/512.1; 175/206
(58) Field of Search .................................. 210/120, 143, 210/175, 180, 188, 257.1, 259, 435, 512.1, 512.2, 708, 737, 767, 774, 787, 806; 175/66, 206; 96/156, 173, 174, 182

(56) References Cited

U.S. PATENT DOCUMENTS

| | | | |
|---|---|---|---|
| 2,016,642 | * 10/1935 | Lincoln | 210/512.1 |
| 2,082,329 | * 6/1937 | Foran et al. | 96/182 |
| 3,489,680 | * 1/1970 | Snavely | 210/512.1 |
| 4,350,596 | * 9/1982 | Kennedy | 210/708 |
| 4,599,172 | * 7/1986 | Gardes | 175/66 |
| 4,876,016 | * 10/1989 | Young et al. | 210/512.1 |
| 5,240,617 | * 8/1993 | Hopf | 210/708 |
| 5,300,132 | 4/1994 | Konijn . | |
| 5,344,255 | 9/1994 | Toor | 405/128 |
| 5,384,052 | 1/1995 | Princen et al. | 210/787 |
| 5,755,892 | 5/1998 | Herold et al. | 134/2 |
| 5,928,519 | * 7/1999 | Homan | 210/774 |
| 6,036,870 | * 3/2000 | Briant et al | 210/787 |
| 6,059,977 | * 5/2000 | Rowney et al. | 210/787 |
| 6,077,433 | * 6/2000 | Brun Henricksen | 210/774 |
| 6,099,742 | * 8/2000 | Komistek | 210/774 |

FOREIGN PATENT DOCUMENTS

| | | | |
|---|---|---|---|
| 2313217 | * 9/1974 | (DE) | 210/708 |
| WO 95/25571 | 9/1995 | (WO) . | |

* cited by examiner

Primary Examiner—Joseph W. Drodge
(74) Attorney, Agent, or Firm—Charles Hartman

(57) ABSTRACT

Water-in-oil emulsions, particularly used invert water-in-oil drilling fluid, are separated into an aqueous component and an oil component by passing the emulsion through a knock down tube having an outer member, the outer member having a receiving end and a terminal end, the receiving end receiving the heated invert water-in-oil drilling fluid, an inner member, substantially coaxially disposed with the outer member, said inner member defining a plurality of apertures through which separated oil passes into the outer member, at least one exit port for a separated oil phase to leave the knock-down tube, said exit port defined by the outer member; at least one compressed air entry in air communication with the source of compressed air, and an exit port into a conduit passing through a filter means for the aqueous phase defined by the terminal end of the knock-down tube; heating the emulsion, and pressurizing the heated emulsion. The separated components are recovered and stored for recycling or disposal.

12 Claims, 2 Drawing Sheets

KNOCK-DOWN SEPARATION OF EMULSIONS

BACKGROUND OF THE INVENTION

1. Filed of the Invention

This invention relates to methods and apparatus for separating emulsions; in particular, this invention relates to methods and apparatus for separating water-in-oil emulsions; and most particularly, this invention relates to methods and apparatus for separating water-in-oil invert drilling fluids.

2. State of the Art

In drilling operations, for example, drilling operations to recover petroleum, drilling fluids pumped down a drill string remove rock cuttings produced by the drill bit from the borehole to the surface. The drilling fluid also helps to control subsurface pressures and provides a protective and stabilizing coating to permeable formations.

Drilling fluid is pumped through a hollow drill string and the drill bit into the borehole while the well is being drilled, thereby cooling and lubricating the drill bit and the drill string. The fluid is then forced up the borehole and through the annulus between the drill string and the wall of the borehole to the surface. At the surface, the rock cuttings are filtered from the drilling fluid through a shaker screen and the screened fluid is re-circulated to the borehole through the drill string and drill bit.

The driller constantly monitors and adjusts the consistency and properties of the drilling fluid during the operation, for example, to compensate for pressure changes within the well as the drill bit penetrates the various rock strata.

Specific drilling fluid systems are selected to optimize a drilling operation in accordance with the characteristics of a particular geological formation. Those skilled in the art refer to drilling fluids comprising liquid, usually water or oil, and solids in suspension as a drilling mud. Oil-based drilling muds usually contain oil as the continuous phase, although frequently a separate water phase is emulsified in and dispersed throughout the oil phase so that there is no distinct or separate layer of water in the mud. Such water-in-oil drilling muds or fluids will herein be referred to as water-in-oil invert drilling fluids. Water-in-oil invert drilling fluids are normally used to drill through swelling or sloughing shales, salt, gypsum, anhydrite or other evaporite formations, hydrogen sulfide-containing formations and to drill holes through hot (>300 degree F.) formations.

Water-in-oil invert drilling fluids are far superior to the water-based systems for sectors of off-shore drilling and for penetration of water-sensitive layers. They are preparations of the type of water-in-oil emulsions, that is the aqueous phase has broken up into small particles which are heterogeneously distributed in a finely dispersed state within a continuous oil phase. The drilling fluid will contain a solid component, usually a suitable clay. For stabilizing the system altogether and for establishing the desired performance properties, a multiplicity of additives is provided, more specifically emulsifiers or emulsifier systems, weighting agents, fluid-loss additives, alkali reserves, viscosity modifiers and the like.

All water-in-oil invert drilling fluids are designed to function with a range of water contents. This is a necessary feature, since water can enter the mud as a contaminate at any time as one drills though the geologic formations. Normally, the mud will be maintained with a lower water content and a higher mud weight.

Conventionally, the oil phase of such a mud is No. 2 diesel oil, but other oils can be used in special situations, such as a non-polluting mineral oil in environmentally-safe drilling fluids. The water phase may range from freshwater (defined herein to be any water containing less than 1% total dissolved solids) to near saturated calcium chloride water. However, it is never desirable to allow the water to become saturated or super-saturated with calcium chloride. In this condition, a hydrate of the salt will come out of solution as the mud cools and carry water that will weaken the emulsion and cause water wetting of the mud solids. From 35 to 38 percent calcium chloride in the water in an upper limit for safe operation.

Many water-in-oil invert drilling fluids use a calcium or magnesium fatty-acid soap as the primary emulsifier. Such a soap adequately emulsifies the mud at temperatures up to about 275 degree to 300 degree F. for freshwater or sodium chloride water. At higher temperatures and for calcium chloride water, special supplemental emulsifiers, generally polyamides, are needed. The soap also adds viscosity to the oil and provides a weak gel structure which helps in barite suspension.

The emulsion adds viscosity and enhances fluid loss control to the mud compared to non-emulsified muds. The emulsified water droplets affect fluid viscosity in the same manner as inert solids. As mud density is increased, it is necessary to decrease the maximum allowable water content in order to minimize the plastic viscosity. At mud weights above 18 lb/gal. the water content should be less than 12 percent. The water also decreases fluid loss in the same manner as oil emulsified in a water-base mud.

All of the solids in an oil-mud must be wet by the oil to prevent agglomeration that causes high viscosities and settling of the particulates. Since barite and drilled solids are naturally water-wet, an oil-wetting agent is necessary in oil-mud. The soaps 15 do some of the oil wetting. However, they are not strong enough nor do they act fast enough to handle a large influx of water-wet solids. Rapid additions of barite, fast drilling in soft shales, and water-mud contamination are all cases where a special oil-wetting surfactant is needed.

Although the soap and water contents provide viscosity to an oil-mud, additional viscosity is often needed for suspension, especially in the lower mud weight range.

Either asphalts or amine treated bentonite are normally used for this purpose. Asphalt either softens or goes into solution in the oil to cause thickening of the oil. It may also react with other mud components to cause development of a grease-like structure. The amine treated bentonite is dispersible in oil and acts as a colloid to cause increased viscosity.

Despite the advantages of water-in-oil invert drilling fluids they have one tremendous disadvantage—once they have been used of a drilling operation, they contain the additives for that particular hole and are not useful for recycling, so the driller has a large quantity of muddy emulsified oil that is are difficult to dispose of. Drilling a borehole produces drill cuttings, comprised of pulverized rock and invert mud residues, which are a muddy water-in-oil emulsion, as a waste material. As the use of water-in-oil invert drilling fluids has increased in the last several years due to drilling deeper holes, there has been a substantial effort towards a reduction of the environmental impact of oil-contaminated drill cuttings. After the well has been drilled there is a large quantity of a muddy water-in-oil emulsion containing any number of additives and enhancers, as well as all the drill cuttings, that is, the fragments of rock formed by the drill bit, and removed by to conveying upwardly along with the drilling fluid. In practice, these amounts of rock cuttings produced are separated by one or more steps of sieving and additional separating steps such as centrifugation from the major amount of the recycled drilling fluid phase. But the cuttings still have a significant amount of oil on them. All of these waste products should be disposed of in an environmentally friendly manner.

One technique suggested for the treatment and disposal of invert oil waste has been the use of land-farming. Land-farming is a natural waste management process with a minimal energy input requirement. A land-farming site is prepared by stripping and stockpiling topsoil and a layer of humus from the site. The drill cuttings are spread over the area and covered with the stockpiled topsoil and humus. The oil-contaminated drill cuttings and soil are then cultivated and mixed, thereby increasing the contact of drill cuttings with indigenous microorganisms in the soil for microbial degradation of the associated oil. Nitrogen fertilizers are added to enhance the activity of the microorganisms, hereinafter, the active agents. Optionally, a bacterial culture containing active agents, such as manure, can be added to the site.

The cost of land-farming is relatively low compared to other disposal methods.

Moreover, this method does not cause the air emission problems of smoke and particulate matter which may be of concern in incineration facilities. The practice of land-farming has gained considerable approval from environmental regulatory agencies as a method of dealing with hydrocarbon wastes. Another environmental and economical benefit of land-farming is that the disposal can generally be effected without transport of the drill cuttings.

However, for all the purported advantages of land-farming, the technique relies on an ill-defined biological system, and as such can be exquisitely sensitive to poisoning, death of the active agents, infection of the active agents by non-active agents, and the like, as well as to variables that may not be apparent to the operators of the land-farm. The high toxicity of the aromatic components of diesel fuel presents one of the biggest problems for land-farming of water-in-oil invert drilling fluid residue. Since oil-based drilling fluids frequently contain diesel oil fractions containing high concentrations of these toxic aromatic constituents, they can devastate land-farms meant to help in their disposal. Consequently, this form of disposal is not available to many water-in-oil invert drilling fluid waste products.

Another problem is encountered by off-shore drillers. When water-in-oil invert fluids were first introduced, they were frequently disposed of by dumping directly into the ocean. It has been found that non-biodegradable mineral oil water-in-oil invert drilling fluids and drill cuttings disposed of by dumping to the bottom of the ocean remain there for years, obviously an undesirable ecological situation. Such waste still adversely affects sensitive marine eco-system years after such unwise disposal. Moreover, the same problems will arise upon work with water-based oil-in-water emulsion fluids.

In order to allow disposal of the water-in-oil invert drilling fluids, ecologically compatible and especially of biodegradable oil phases have been suggested for use in connection with the composition of oil-containing drilling fluid systems. Non-polluting oils suggested include mineral oil fractions free of aromatics, vegetable oils, for example peanut oil, soybean oil, linseed oil, corn oil and rice oil, and oils of animal origin such as whale oil. However, subsequent, more detailed investigations have proved that the readily biodegradable oils of vegetable or animal origin cannot generally be used for practical reasons. For example, the Theological properties of such oil phases can not be controlled over the temperature range as required in practice of from low temperatures ranging from about 0 degrees C to high temperatures of 250 degree. C and higher temperatures that are routinely encountered in actual practice.

So the problem of disposing of the used water-in-oil invert drilling fluid in an environmentally acceptable way continues to present itself. The preferred practice used is simply the storage of the muddy water-in-oil emulsion containing all the drilling additives and fine cuttings in a hope that some day it can be processed. Millions of tons of used water-in-oil invert drilling fluid are stored at various locations around the world. Even if all the water-in-oil invert drilling fluids of the world were somehow made entirely environmentally satisfactory today, the continuing problem of stored used water-in-oil invert drilling fluids must still be addressed.

A variety of separation techniques are known for separating intractable emulsions. For example, Konoijn has invented several apparatus and methods for separating liquids from gases, see for example, U.S. Pat. No. 5,683,629 and 5,300,132, but the techniques shown therein are not generally applicable to the distinct task of separating liquids from immiscible liquids when an emulsion is present.

Other attempts have also been made to separate sand and soil from a combination of water and oil for remediation of contaminated sites. Too, for example, in U.S. Pat. No. 5,344,255, teaches a method of using a surfactant to remediate sites contaminated with oil. However, the emulsion he is faced with is less concentrated and less intractable than the emulsions used for water-in-oil invert drilling fluids, which are fluids made specially to be emulsions that will not separate under the extreme conditions found down-hole.

SUMMARY OF THE INVENTION

This invention provides an apparatus and method to separate water-in-oil emulsions. The emulsions are separated by heating the emulsion, pressurizing the heated emulsion, and passing it through a perforated knock-down tube. The apparatus required for this process to work includes computer control. This invention works particularly well to separate used water-in-oil invert drilling fluids.

One aspect of this invention is an apparatus for the separation of an water-in-oil invert driling fluid having an oil phase containing an emulsified water phase and solid particulate particles. This aspect includes a source of heat; means to allow heat transfer of the source of heat and an invert water-in-oil drilling fluid; a source of compressed air; at least one knock-down tube; means to receive the separated oil phase; means to receive the separated water phase; and means to allow the excess air pressure to escape. The knock down tube includes an outer member having a receiving end and a terminal end, the receiving end receiving the heated invert water-in-oil drilling fluid, an inner member, substantially coaxially disposed with the outer member, said inner member defining a plurality of apertures, at least on exit port for a separated oil phase to leave the knock-down tube, said exit port defined by the outer member; at least one compressed air entry in air communication with the source of compressed air, and an exit port for the aqueous phase defined by the terminal end of the knock-down tube.

Another aspect of this invention is a method of separating an water-in-oil invert drilling fluid having an oil phase containing an emulsified water phase and solid particulate particles into an oil phase, an aqueous phase, and solid particles. The invert water-in-oil drilling fluid is first heated, then passed through a knock-down tube wherein compressed air is forced into the knock-down tube through a compressed air entry port, allowing the oil phase to be drawn off, while the aqueous phase is collected, and solids are removed from the aqueous phase. Finally, the air pressure is released from the system.

Yet another aspect of this invention is an apparatus for the separation of a fluid having an oil phase containing an emulsified water phase. This aspect includes a source of heat; means to allow heat transfer of the source of heat and a water-in-oil emulsion; a source of compressed air; at least one knock-down tube; means to receive the separated oil phase; means to receive the separated water phase; and means to allow the excess air pressure to escape. The knock down tube includes an outer member having a receiving end and a terminal end, the receiving end receiving the heated invert water-in-oil drilling fluid, an inner member, substantially coaxially disposed with the outer member, said inner member defining a plurality of apertures, at least on exit port for a separated oil phase to leave the knock-down tube, said exit port defined by the outer member; at least one compressed air entry in air communication with the source of compressed air, and an exit port for the aqueous phase defined by the terminal end of the knock-down tube.

Yet another aspect of this invention is a method of separating a fluid having an oil phase containing an emulsified water phase into an oil phase and an aqueous phase. The emulsion is first heated, then passed through a knock-down tube wherein compressed air is forced into the knock-down tube through a compressed air entry port, allowing the oil phase to be drawn off, while the aqueous phase is collected, and solids are removed from the aqueous phase. Finally, the air pressure is released from the system.

DETAILED DESCRIPTION OF THE PREFERRED EMBODIMENT

Figure 1:
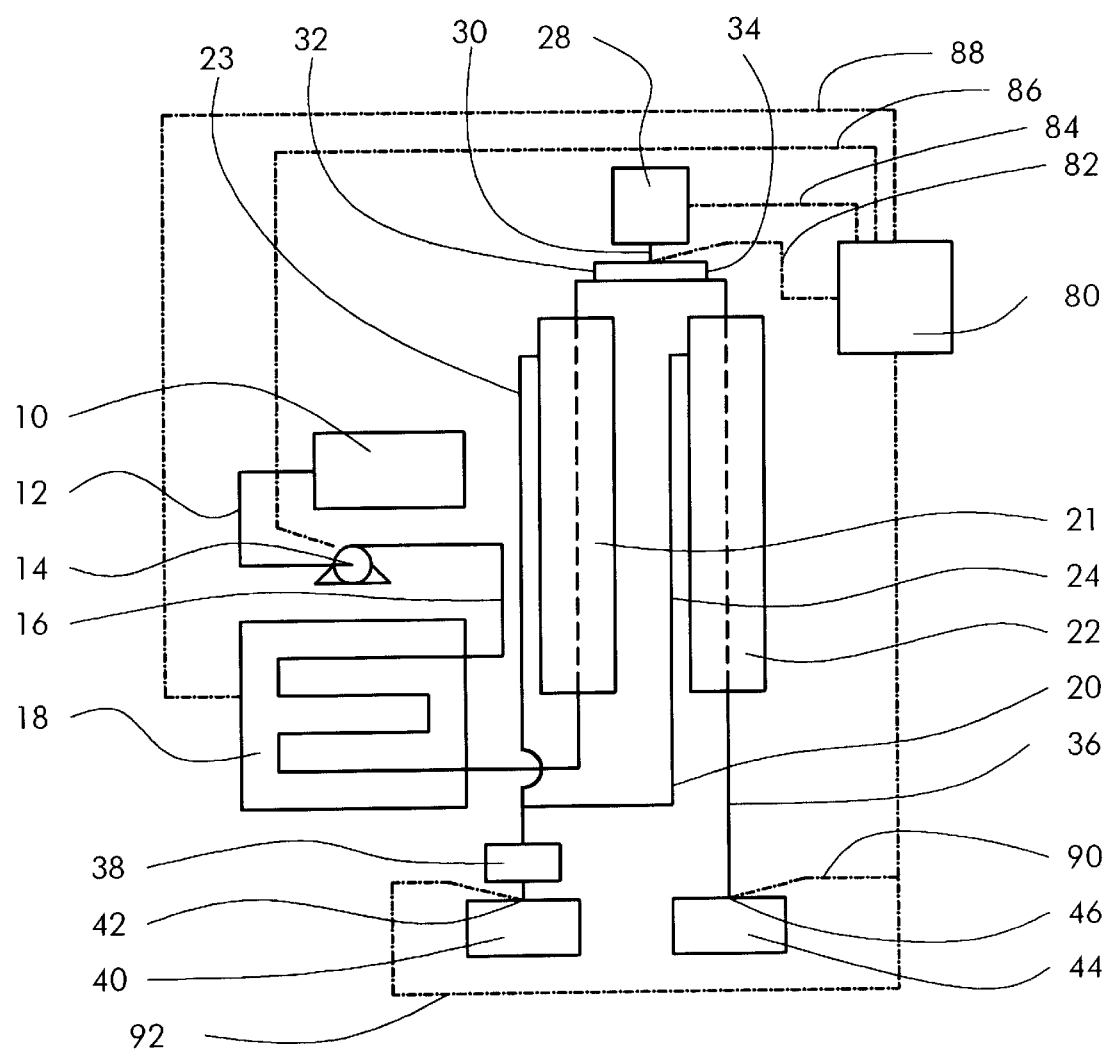
FIG. 1 shows a schematic diagram of the system of the invention.

Referring to FIG. 1, the emulsified fluid to be separated is contained in a partitioned tank 10. In the preferred embodiment, the fluid contained in the tank is a used water-in-oil invert drilling fluid, that is an invert fluid that has been used for drilling a well. Other water-in-oil emulsions can be used as the processed fluid however. A partitioned tank is selected to allow for overflow and back-up control if the system plugs or the like. The partitioned tank is recharged as the water-in-oil invert drilling fluid is processed, from the storage facility on site where the fluid is stored. The fluid moves from the tank through a first line 12 to pump 14. The pump moves the fluid through a second line 16 to a source of heat 18. It is preferable to use steam heat, but any other acceptable heat source, such as an open flame or electric resistance heating can be used. In the preferred embodiment, the water-in-oil invert drilling fluid is passed through tubes in a steam heated environment. Because the processed fluid is largely diesel fuel, open flames are less preferred than alternative sources of heat for water-in-oil invert drilling fluids.

The fluid is heated to between about 100° C. and 300° C., preferably between 125° C. and 200° C. Preferably the fluid passes through the system at between about 0.25 m³/minute to about 5 m³/minute, preferably from about 1 m³/minute to about 2.5 m³/minute of a used water-in-oil invert drilling fluid. Other fluids may be passed through the system at greater or lesser through-puts.

The heated fluid then passes to a first knock-down tube 21, which in turn is connected to a second knock down tube 21. For clarity in the Fig., only two are shown, but between two and twenty may be used, preferably between six and fourteen, and as many as needed to separate the particular processed fluid may be used. The number of tubes is at least partially dependant on the size of the apparatus; larger stationary facilities may use fewer tubes.

The two knock-down tubes are connected by a fluid conduit 26. The first fluid conduit has a first pressure conduit 32 and a second pressure conduit 34 leading to it to supply pressure to the first knock-down tube 21 and the second knock-down tube 22 respectively. The air pressure conduit 30 leads from an air compressor 28 to supply the knock-down tubes with high air pressure. Preferably the air pressure is supplied at between about 2 and 50 atmospheres pressure, more preferably between about 5 and 25 atmosphere pressure, and most preferably between about 10 and 20 atmospheres. A first separated oil conduit 30 allows the separated oil from the first knock-down tube 21 to flow out of the knock-down tube. Similarly, a second separated oil conduit 24 allows the separated oil from the second knock down tube 22 to flow out of the knock-down tube. The first and second separated oil conduits 23 and 24 passes to a filter 38 and then to an oil receiving tank 40. Here the oil is collected and the high air pressure of the system bleeds off through a pressure bleed off valve 42 into the atmosphere to allow a constant pressure inside the system.

At the bottom of the second knock-down tube 22 a water and solids conduit 36 leads to a water receiving tank 44. The water and the solids are collected here, and a second pressure bleed off valve 46 bleeds off the excess air pressure.

Figure 2:
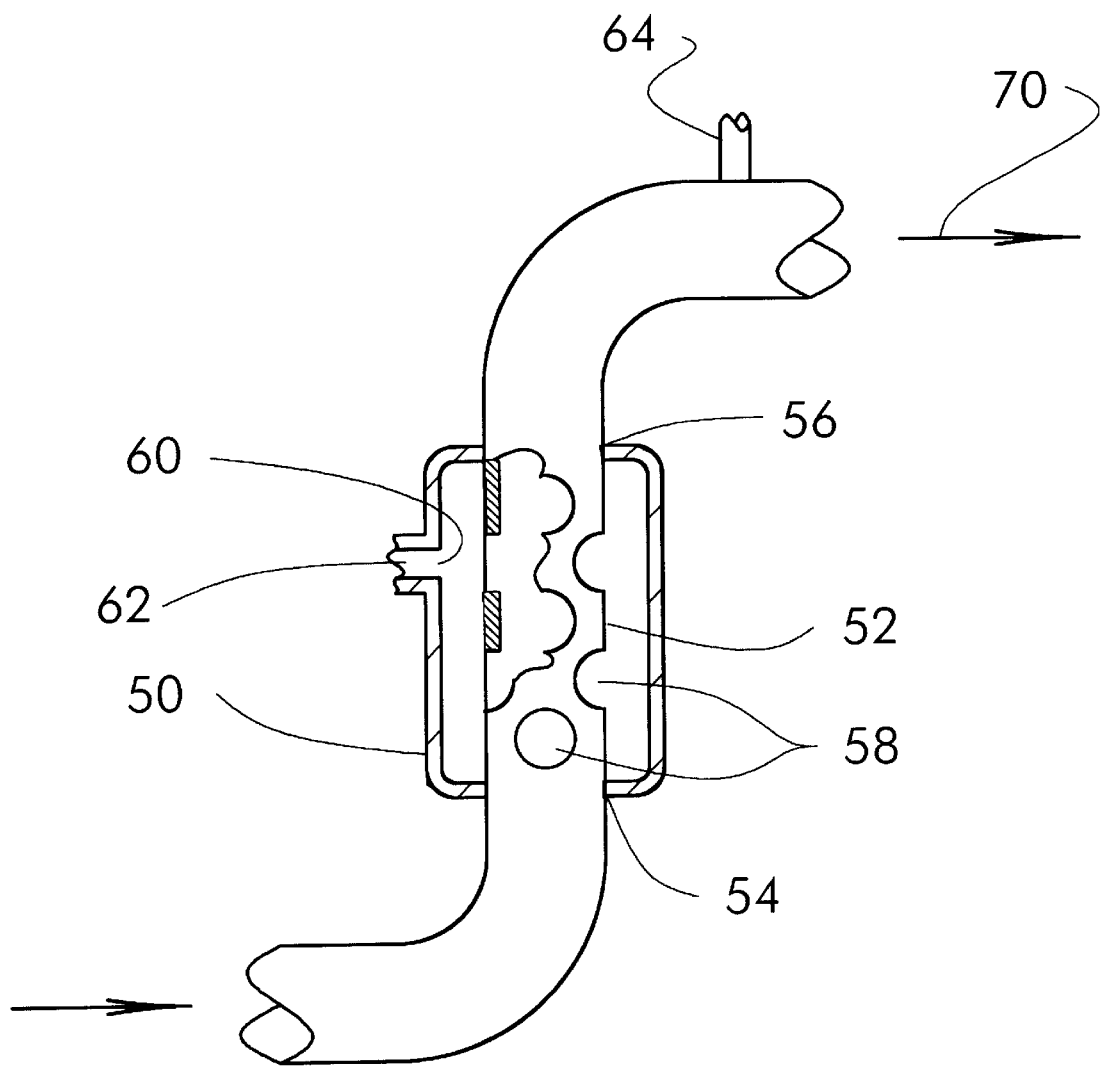
FIG. 2 shows a partially cut-away elevational view of a knock-down tube of this invention.

Referring to FIG. 2, each knock-down tube (21 and 22 in FIG. 1) has an outer member 50. The outer member is a pressure resistant metal tube. Any suitable metal can be used for the outer member, although steel will be the usually selected metal; and because of the extremely erosive nature of the water-in-oil drilling mud, stainless steel is preferred. The outer member is connected to the means of heat transfer, and the processed fluid, preferably a used water-in-oil-invert drilling fluid, to passes there-into. Disposed inside the outer member is an inner member 52. It is connected to the outer member by welding or similar pressure resistant connection means, at both the bottom of the outer member 54 and the top of the outer member 56. The processed fluid passes though the knock-down tube by flowing through the inner member. The inner member may be made of stainless steel or other erosion resistant material. The choice of material is made largely on the basis of erosion resistance to the solid component of the drilling mud entrained with the water-in-oil emulsion. For fluids that do not have a solid phase, other less costly alternative materials can be used, such as carbon steel. Each inner member has a plurality of perforations 58 along its length.

The processed fluid enters the knock-down tube at the tube entrance flowing as shown by the arrow (and upwardly in the case of the FIG. 2). The processed fluid passes the plurality of apertures 58 and then proceeds to the exit of the tube 70. The heat provided by the apparatus creates a temperature sufficient to allow the oil phase to cross the apertures in the inner member.

At the top of the outer member 56 of each knock-down tube is an aperture 60 that allows separated oil to pass out of the outer member to a separated oil conduit 62. All the separated oil conduits connected (shown in FIG. 1) and pass into a filtering means. The preferred filtering means is Water Guard, Houston, Tex. The filtered separated oil is then passed into a separated oil receiving tank.

The source of compressed air, which can be any conventional air compressor, as shown in FIG. 1 that can produce acceptable pressures and volumes of compressed air, compresses ambient air and passes the compressed air into each knock-down tube through a compressed air line 64. It is preferable to have the compressed air line pass the compressed into the top of the tube. It is possible to have compressed gases of other sorts, for example, carbon dioxide, pure nitrogen, or argon or other inert gas, pass through the system to prevent the inadvertent combustion of the oil in the knockdown tubes.

At the end of the each one of the plurality of tubes, the contents of the inner member is passed onto the next knock-down tube, or in the case of the terminal knock-down tube (exemplified by knock-down tube 21 in the FIG. 1) the material in the tube passes to an aqueous recovery and solids settling tank.

Controlling the entire operation is a computer control room 80. All computer controls are kept in a clean room, to avoid contamination with oil, water or mud. The computer control keeps the parameters constant for a given used oil source. Lines (shown as broken in the FIG. 1) extend from the control room to the sensors at the air pressure source 84, the air pressure lines 82, the pump 86, the heat source 88, the air pressure bleed valves 89 and 92 to verify that the operational parameters are within the predetermined limits of operation for the system. The computer is programed to correct parameters of the process that have strayed from the predetermined limits, thereby allowing the operator to easily maintain the correct operation of the system.

This invention operates by contacting the emulsion to be separated with a heat source. The invert water-in-oil drilling fluid is first heated, then passed through a knock-down tube wherein compressed air is forced into the knock-down tube through a compressed air entry port, allowing the oil phase to be drawn off, while the aqueous phase is collected, and solids are removed from the aqueous phase. Finally, the air pressure is released from the system.

This invention can be used for a separating a generalized fluid having an oil phase containing an emulsified water phase. As in the preferred embodiment for a water-in-oil invert drilling fluid, this aspect includes a source of heat; means to allow heat transfer of the source of heat and a water-in-oil emulsion; a source of compressed air; at least one knock-down tube; means to receive the separated oil phase; means to receive the separated water phase; and means to allow the excess air pressure to escape. As in the preferred embodiment, the knock down tube includes an outer member having a receiving end and a terminal end, the receiving end receiving the heated invert water-in-oil drilling fluid, an inner member, substantially coaxially disposed with the outer member, said inner member defining a plurality of apertures, at least on exit port for a separated oil phase to leave the knock-down tube, said exit port defined by the outer member; at least one compressed air entry in air communication with the source of compressed air, and an exit port for the aqueous phase defined by the terminal end of the knock-down tube.

To accomplish the embodiment for the generalized processed fluid, this aspect of the invention is a method of separating a fluid having an oil phase containing an emulsified water phase into an oil phase and an aqueous phase. The emulsion is first heated, then passed through a knock-down tube wherein compressed air is forced into the knock-down tube through a compressed air entry port, allowing the oil phase to be drawn off, while the aqueous phase is collected, and solids are removed from the aqueous phase. Finally, the air pressure is released from the system.

EXAMPLES

The following examples are shown to exemplify and clarify the invention. These examples should not be read as defining the scope of the invention or otherwise limiting the invention.

Example 1

This example shows how the process of this intention can be used to process used water-in-oil invert drilling fluid.

A sample of used water-in-oil invert drilling fluid is obtained from drilling in an oil field located in Grande Prairie, Alberta, Canada. This sample was then analyzed to determine the amount of hydrocarbon components and elemental components in it. The results of the sampling is shown in table 1 and table 2 herein below.

This sample contains the following:

TABLE 1

| Parameter | Units | Result |
| --- | --- | --- |
| Oil and Grease (by FTIR) | Volume percent (Vol %) | 91.3 |
| Total Petroleum Hydrocarbon (by FTIR) | Vol % | 87.7 |
| TSS on Total Sample | mg/l | 550 |
| Flashpoint | ° C. | >100 |

Elemental analysis showed the following elements to be present in a sulfite ask digestion of the water-in-oil invert fluid. The high calcium level is the result of the addition of calcium chloride to the drilling fluid.

TABLE 2

| PARAMETER | SYMBOL | DETECTION LIMIT (mg/kg) | RESULTS (mg/kg) |
| --- | --- | --- | --- |
| Calcium | Ca | 0.65 | 236 |
| Magnesium | Mg | 2.1 | 11.7 |
| Potassium | K | 2.1 | 30.2 |
| Sodium | Na | 2.1 | 15.9 |
| Aluminum | Al | 0.21 | 31.5 |
| Iron | Fe | 0.21 | 34.2 |
| Lead | Pb | 0.42 | 5.32 |
| Barium | Ba | 0.21 | 16.4 |

This sample was fed through an apparatus of the invention at an average temperature of 77.1 and 84.9° C. and pressurized to 798.90 KPa. Up to 2.3 cubic meters per minute and the average was 1.9278 cubic meters per minute was passed through the apparatus at these conditions. The oil and the aqueous phase were separated and depressurized. The oil phase contained essentially no residual water or solids, and the water phase contained essentially no oil. The solids were separated from the water phase, and the solid portion of the fluid was oil free, and could be used as an environmentally acceptable road topping.

This invention has been described by reference to specific examples and embodiments. However, variations, alterations, and modifications will undoubtedly suggest themselves to those of ordinary skill in the art. The appended claims are intended to encompass all such variations, alterations and modifications.

What is claimed is:

1. An apparatus for the separation of an water-in-oil invert drilling fluid having an oil phase containing an emulsified water phase and solid particulate particles, comprising:

a source of heat;

means to allow heat transfer between of the source of heat and an invert water-in-oil drilling fluid;

a source of compressed air;

at least one knock-down tube having;

an outer member having a receiving end and a terminal end, the receiving end receiving the heated invert water-in-oil drilling fluid and a conduit to receive compressed air from the source of compressed air, an inner member, substantially coaxially disposed with the outer member, said inner member defining a plurality of apertures the source of heat sufficient to allow the oil phase of the water-in-oil invert fluid to cross the apertures in the inner member, at least one exit port for a separated oil phase to leave the knock-down tube, said exit port defined in the outer member;

at least one compressed air entry in air communication with the source of compressed air, and at least one separated water phase exit port including a filter means defined by the terminal end of the inner tube of the knock-down tube;

a clean tank to receive the separated oil phase having means to allow excess compressed air to escape; and a clean tank to receive the separated water phase having means to allow excess compressed air to escape.

2. The apparatus of claim 1 wherein the invert drilling fluid is contained in a multi-part tank.

3. The apparatus of claim 1 wherein the source of heat is steam.

4. The apparatus of claim 1 wherein the outer member has a diameter of between about 50 mm to about 200 mm.

5. The apparatus of claim 1 wherein the inner member has a diameter of between about 15 mn to about 75 mm.

6. The apparatus of claim 1 wherein the apparatus further includes a computer control.

7. An apparatus for the separation of an used invert water-in-oil drilling fluid, comprising:

a multi-part tank containing the used invert water-in-oil drilling fluid;

a source of heat;

means to allow heat transfer of the source of heat to the used invert water-in-oil fluid;

a source of compressed air;

at least one knock-down tube having an inlet port, the inlet port connected to the multi-part tank and a conduit to receive compressed air from the source of compressed air, the tube also having;

an outer member having a receiving end and a terminal end, the receiving end receiving the heated invert water-in-oil drilling fluid, an inner member, substantially coaxially disposed with the outer member, said inner member defining a plurality of apertures, the source of heat sufficient to allow the oil phase of the water-in-oil invert fluid to cross the apertures in the inner member,, at least one separated oil phase exit port defined by the outer member and including a filter means;

at least one compressed air entry in air communication with the source of compressed air, and at least one separated water exit port defined by the terminal end of the inner member of the knock-down tube;

a clean tank to receive the separated oil phase having means to allow excess compressed air to escape; and a clean tank to receive the separated water phase having means to allow excess compressed air to escape.

8. The apparatus of claim 7 wherein the invert drilling fluid is contained in a multi-part tank prior to passage into the knock-down tube.

9. The apparatus of claim 1 wherein the source of heat is steam.

10. The apparatus of claim 7 wherein the outer member has a diameter of between about 50 mm to about 200 mm.

11. The apparatus of claim 18 wherein the inner member has a diameter of between about 15 mm to about 75 mm.

12. The apparatus of claim 7 wherein the apparatus further includes a computer control.

* * * * *